(12) United States Patent
DeVol (10) Patent No.: US 9,855,988 B2
(45) Date of Patent: Jan. 2, 2018

(54) SUSPENSION LIMITING DEVICE, SYSTEM AND METHOD

(71) Applicant: DEVOL ENGINEERING, INC, Enumclaw, WA (US)

(72) Inventor: Ted DeVol, Enumclaw, WA (US)

(*) Notice: Subject to any disclaimer, the term of this patent is extended or adjusted under 35 U.S.C. 154(b) by 151 days.

(21) Appl. No.: 14/949,802

(22) Filed: Nov. 23, 2015

(65) Prior Publication Data

US 2016/0144926 A1 May 26, 2016

Related U.S. Application Data

(63) Continuation-in-part of application No. 29/509,916, filed on Nov. 21, 2014, now abandoned.

(60) Provisional application No. 62/083,072, filed on Nov. 21, 2014.

(51) Int. Cl.
*B62K 25/04* (2006.01)

(52) U.S. Cl.
CPC ........ *B62K 25/04* (2013.01); *B62K 2025/047* (2013.01)

(58) Field of Classification Search
CPC .......................... B62K 25/04; B62K 2025/047
See application file for complete search history.

(56) References Cited

U.S. PATENT DOCUMENTS

| | | | | |
|---|---|---|---|---|
| 2,868,482 A * | 1/1959 | Westcott, Jr. | ........... | B64C 25/10 244/102 R |
| 4,735,276 A * | 4/1988 | Burton | ................... | B62K 25/08 180/219 |
| 5,037,141 A * | 8/1991 | Jardine | ................... | F16L 23/04 138/89 |
| 7,051,852 B2 * | 5/2006 | Maret | ................... | B60G 17/005 188/300 |
| 2012/0292148 A1 * | 11/2012 | Phipps | ................... | B62K 25/08 188/300 |

* cited by examiner

*Primary Examiner* — Joseph M Rocca
*Assistant Examiner* — Marlon A Arce (57) ABSTRACT

A suspension limiting device secured to a fork guard and telescopic suspension where upon compression of suspension, is latched onto a secondary, multi-piece ring that is fixed to the fork tube of a motorcycle front suspension fork, which when latched, lowers the weight bias of the vehicle and controls front-end lift during race starts, whereupon the latch automatically releases from the multi-piece ring immediately upon pressure to the suspension via applying the front brake on the vehicle or contacting a bump during forward motion which then automatically allows the suspension to use full travel. The suspension limiting device allows a user to limit front fork travel by pressing the suspension down and easily pressing the latch before, during or after the latch passes the multi-piece ring to secure connection upon retraction of the suspension.

15 Claims, 12 Drawing Sheets

SUSPENSION LIMITING DEVICE, SYSTEM AND METHOD

TECHNICAL FIELD

This invention relates to the function and adjustment of motorcycle suspension and the improvement of center of gravity, stability, and traction. Specifically, suspension limiting devices are made for the purpose of temporarily lowering the front end of a motorcycle thus lowering the center of gravity which restricts front wheel lift creating more traction resulting in higher speed for improved race starts.

BACKGROUND

At the start of any type of motorcycle race, motorcycles are lined up at a stop at a starting line. A race begins when all motorcycles leave the starting line at the same time as fast as they can to get ahead of all the other users thus creating a major advantage for winning the race. Typically, motorcycles tend to wheelie immediately upon takeoff from the starting line in a race resulting in unpredictable traction and lower terminal speed which can contribute to a lower finishing result. To counter this, users lean forward at the start of the race, putting more weight on the front end, thus creating slightly better traction in the front tire which contributes to minimal higher speed. Unfortunately, simply leaning forward does not solve the problem of the front wheel lifting off the ground because the high acceleration and speed quickly shifts a user's weight toward the rear end causing the front end to lift.

Existing products have been developed to help solve the issue of the front tire lifting off the ground at the start of races. When engaged, these products allow a user to temporarily lock down front suspension travel which lowers front vehicle weight bias and dramatically prevents the front wheel from rising as much off the ground as without the device thus improving elapse times from the starting line to the first corner. These products are designed to disengage with further compression of suspension with normal braking or a bump significant enough to compress the suspension past the engagement tension on the device, relieving the suspension to function as normal.

One existing product is a pin and coil spring system. Pin and coil spring systems are susceptible to damage and being torn off the motorcycle in close racing situations. Pin and coil systems wear out quickly due to crucial component exposure to elements which leads to difficulty of engagement. The pin and coil spring design is difficult to engage or lock into hold down position due to requirement of exact timing needed to catch the pin with the receptacle.

Another existing product that used for limiting suspension is a magnetic trigger system. The magnetic trigger lever is vulnerable to being torn off in close racing situations. The magnetic trigger system is also difficult to engage into locked position that holds the suspension down due to requirement of exact timing to release the magnetic trigger and precise alignment required to line up the two parts of that device.

The trigger system also requires higher focus from a user in order to pull the trigger for engagement. A user must compress the suspension as the trigger must be pulled the opposite direction of the compression, whereas the suspension limiting device uses the user's inertia to the advantage and can be engaged with one swift movement of the user.

In addition, both existing product types mentioned require complete removal of the entire suspension component from the motorcycle to install the restraint ring.

BRIEF DESCRIPTION OF THE DRAWINGS

The aspects of the present disclosure are best understood from the detailed description when read in relation to the accompanying drawings. The drawings illustrate a variety of different aspects, features, and embodiments of the disclosure. As such, the illustrated embodiments are merely representative and not exhaustive in scope. The disclosure will now be described with reference to the accompanying drawings, wherein like numbers refer to like elements.

FIG. 7A shows the latch component and multi-piece ring connection action using a leaf spring to control latch component actions.

FIG. 7B illustrates the transition point or engagement zone where the latch component and multi-piece ring may either engage or disengage as related to FIG. 7A. FIG. 7B shows the latch component and multi-piece ring system connection action using the flat spring to control latch component actions.

FIG. 7C shows the latch component and multi-piece ring system connection action using the flat spring to control latch component actions.

FIG. 8A shows the latch component and multi-piece ring system connection action using an elastomeric material to control latch component actions.

FIG. 8B illustrates the transition point or engagement zone where the latch component and multi-piece ring may either engage or disengage as related to FIG. 8A. FIG. 8B shows the latch component and multi-piece ring system connection action using the elastomeric material to control latch component actions.

FIG. 8C shows the latch component and multi-piece ring system connection action using the elastomeric material to control latch component actions.

DETAILED DESCRIPTION

This present invention resolves the problems listed above and more. In the disclosure of illustrations this suspension limiting device is used on a telescopic front motorcycle suspension fork, but this design could be used in other applications where this system could be modified to limit the concentric movement on telescopic suspension on other types of vehicles. The illustrations show a telescopic suspension fork with an inner tube, outer tube and fork guard. The illustrations show the outer or larger tube as the upper tube, however; with slight design changes the inner tube could become the upper tube in alternative designs of suspension.

Figure 1:
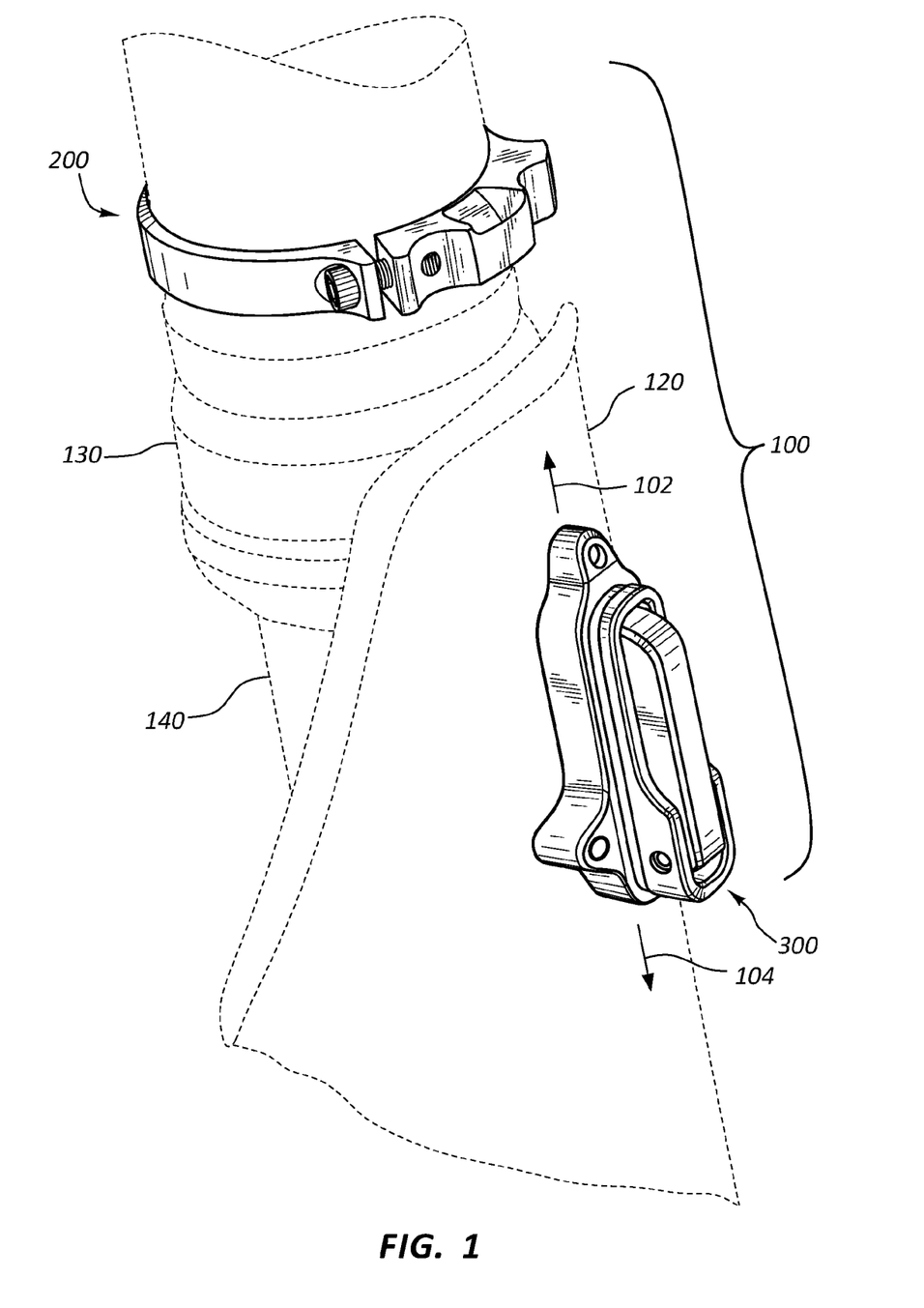
FIG. 1 is a perspective view of a suitable environment showing a suspension limiting device comprising of a multi-piece ring mounted on a fork tube and a latch component mounted to a fork guard.

FIG. 1 illustrates a perspective view of a suitable environment showing a suspension limiting device 100 in accordance with at least one embodiment showing two major elements; a multi-piece ring 200 mounted on an outer fork tube 130 with a secondary element, a latch component 300 mounted to a fork guard 120.

FIG. 1 illustrates where the suspension limiting device 100 may be positioned in the disengaged location. The latch component 300 can be mounted into a fork guard 120 in a location determined by user preference with variations shown with upper arrow 102 and lower arrow 104.

An inner fork tube 140 telescopes perpendicular with the outer fork tube 130 during normal operation. Inner fork tubes 140 and outer fork tubes 130 maintain an extended or full travel position with the use of spring(s), air, liquid, and/or nitrogen as original equipment from a manufacturer. On different models of telescoping forks, the mounting of the suspension limiting device 100 may be reversed with an outer fork tube 130 acting as a lower fork tube while an inner fork tube 140 acting as an upper fork tube opposite of the illustration in FIG. 1.

The suspension limiting device 100 may be changed or modified to limit or hold a mechanical or technical device in a restricted position in other applications. The multi-piece ring 200 can be substituted by manufacturing a tapered receiver 220 directly into the outer fork tube 130 during original equipment manufacturing. A latch component 300 can be incorporated into the fork guard 120 during the manufacturing process of the fork guard 120.

Figure 2:
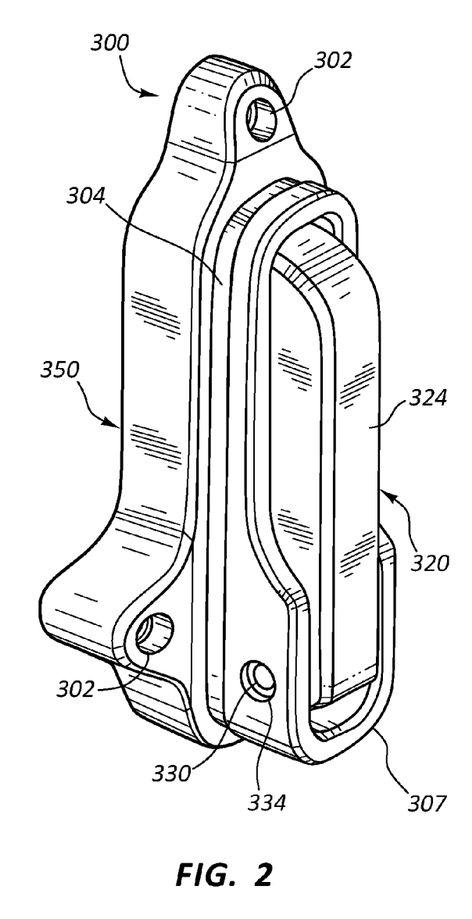
FIG. 2 is a top, front and left-side perspective view of the latch component in accordance with at least one embodiment as related to FIG. 1.

FIG. 2 is a top, front and left-side perspective view of the latch component 300 in accordance with at least one embodiment as related to FIG. 1. FIGS. 2, 3, 4, 5 and 6 show different views of the latch component 300 comprising of two major elements; a latch housing 350 and a latch 320.

The latch housing 350 is secured to the fork guard 120 by mounting points 302 designed to hold the latch 320 in the necessary positions. The latch housing 350 is attached using screws, however; the latch housing 350 can be attached to a fork guard 120 with other types of fasteners such as glue, weld, bolt(s), nail(s), clip(s), button(s), etc.

In this embodiment three (3) holes are penetrated into the fork guard 120 at precise locations for fasteners to enter through and secure the latch housing 350 to the fork guard 120. The holes are penetrated using a tool with a drill jig specifically for the suspension limiting device 100. A drill jig is not shown in drawings.

The latch 320 is positioned in the latch housing 350 and is a component that is significant to a secure connection between the latch component 300 and the multi-piece ring 200. A press point 324 is located on the front of the latch 320. When pressure is applied to the press point 324, the latch 320 rotates on a pivot pin 330 located at a pivot point 334 to move the latch component 300 into the open position. Other embodiments may use other types of leverage elements. The pivot point 334 is where the latch 320 is secured to the latch housing 350. Although the pivot point 334 is shown near the bottom of the latch housing 350; the pivot point 334 could be placed in any other area on the latch housing 350 to create leverage. The pivot point 334 is shown at the opposite end of the latch stop 326 for greatest leverage.

The press point 324 design is smooth and flat allowing a user to easily operate. The inertia used to compress the suspension by a user can be extended into their reach and touch the press point 324 with enough pressure to engage the latch 320 with the tapered receiver 220. The direction the latch component 300 is secured to the fork guard 120 also adds to the benefit of the user by allowing any hand size with or without gloves to operate the latch component 300. Other embodiments for a press point 324 may include a trigger, push-pin, button, switch, knob, and/or control.

A cover retaining groove 304 located within an elevated latch perimeter 307 is shown in FIG. 2 where an elastomeric cover can be installed to keeps unwanted material out, allowing consistent proper function of the system. Another possible embodiment that could be used to keep unwanted material out of the latch component 300 is an elevated latch perimeter 307 that engulfs the latch 320 leaving little to no open space in the left, right, top, and/or bottom of the latch 320.

Figure 3:
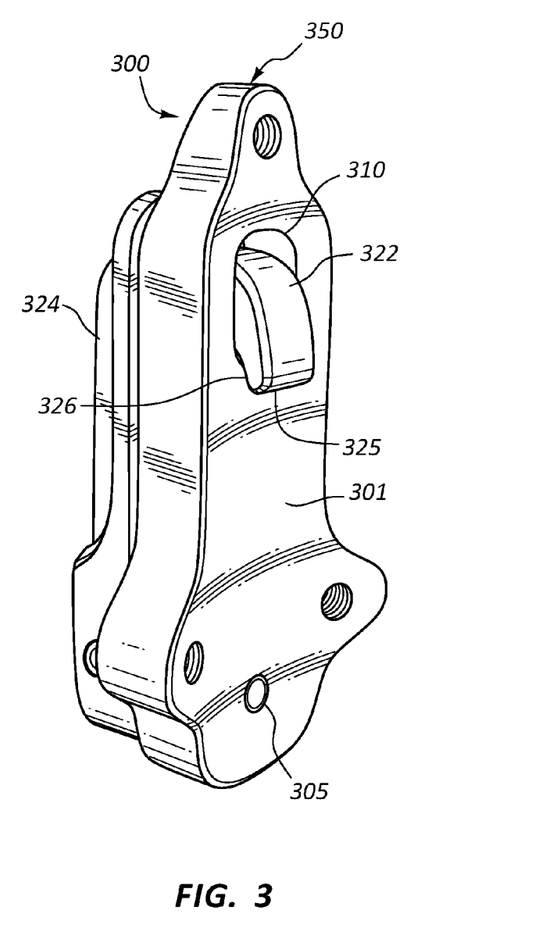
FIG. 3 is a top, rear and right-side perspective view of the latch component in accordance with at least one embodiment, the opposite view of FIG. 2.

FIG. 3 is a top, rear and right-side perspective view of the latch component 300 in accordance with at least one embodiment, the opposite view of FIG. 2.

A fork guard coupling surface 301 matches the curve of a fork guard 120 for proper fitment. The drill jig also includes the position for an opening to be placed in the fork guard 120 that allows the latch 320 to extend through a latch window 310 in a fork guard 120. Although, the latch housing 350 is shown with three (3) mounting points 302, other embodiments may include more or fewer mounting points 302.

Figure 7A:
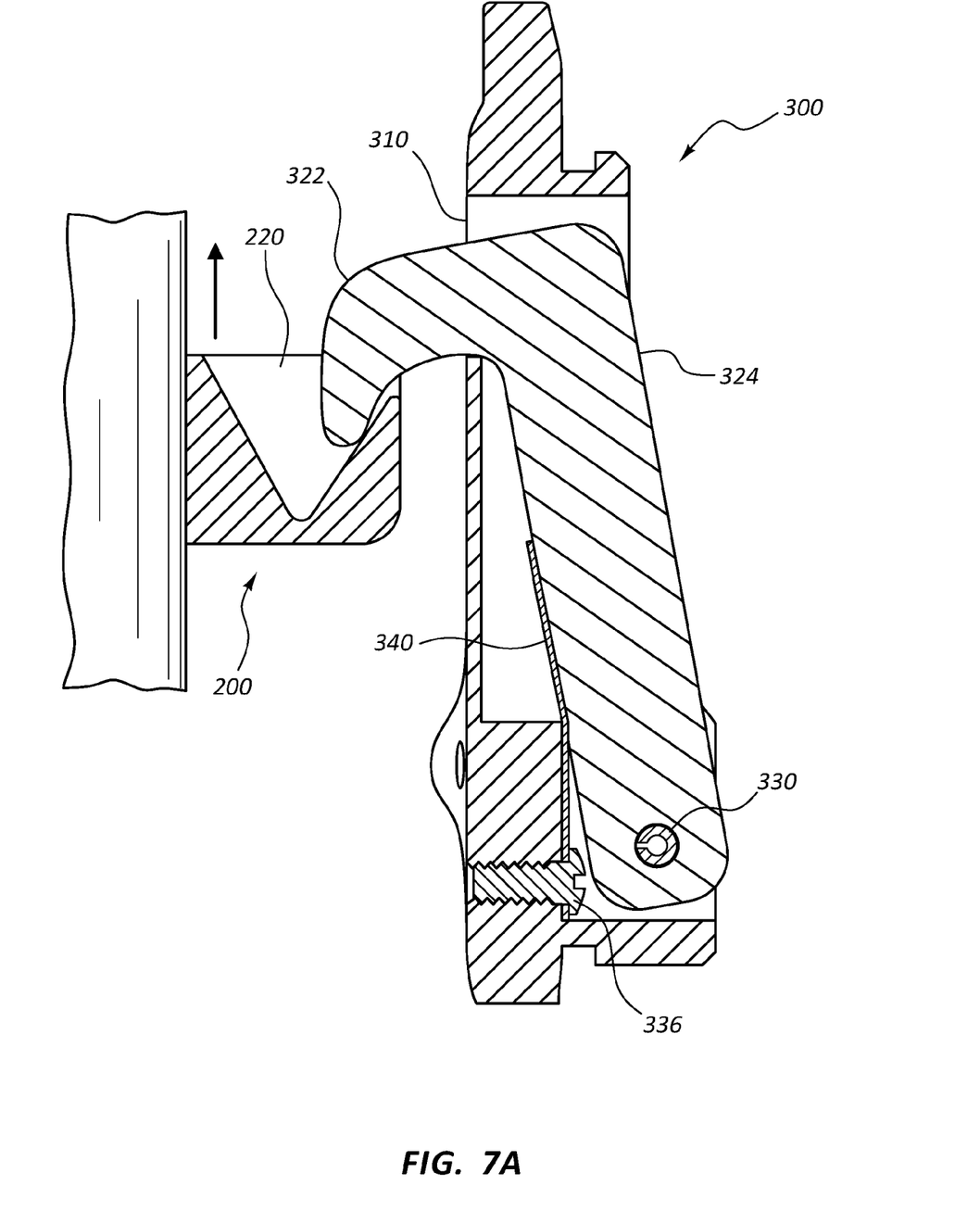
FIG. 7A is a left side cut-away view of the latch component cut in half as related to FIG. 4 in the open position engaged with a tapered receiver of the multi-piece ring.

A spring retainer location 305 shows the placement of a fastener that may secure a flat spring 340, as shown in FIG. 7. Although the spring retainer location 305 is shown near the bottom of the fork guard coupling surface 301 on the latch housing 350, the spring retainer location 305 may be secured on the latch 320 or in another area on the latch housing 350.

The radius perimeter of a pre-latch arc 322 allows the latch 320 to glide over the underside of the tapered receiver 220 while the latch 320 may be continually pressed in at the press point 324 for the open position. The latch window 310 allows the latch 320 to move the necessary distance for engagement and disengagement actions. A latch stop 326 at the interior of the latch point 325 retains the latch 320 in the proper closed position by contacting the lower portion of the latch window 310 at the closed latch housing stop 308, shown in FIG. 9, with the latch 320 being forced into that position by the flat spring 340 or elastomeric material 360.

Figure 4:
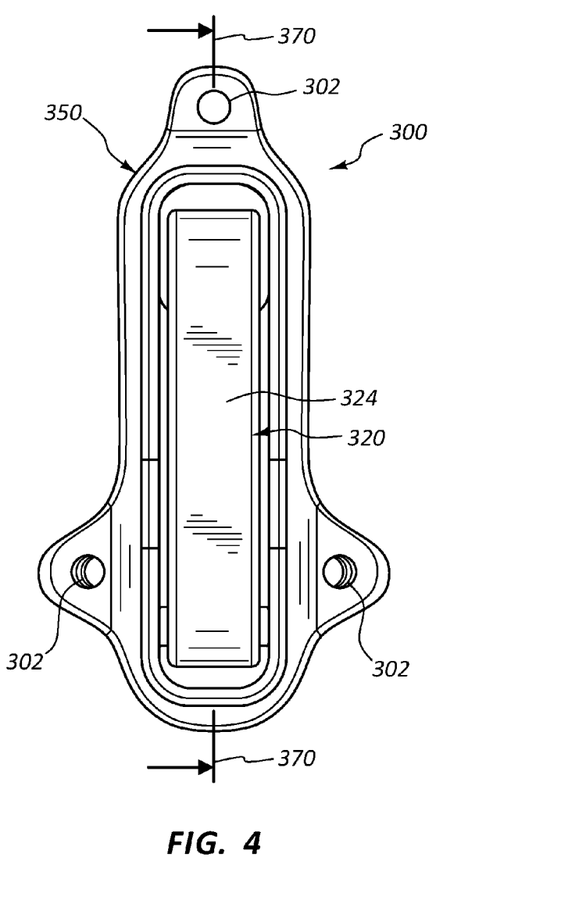
FIG. 4 is a front plan view of the latch component in accordance with at least one embodiment as related to FIG. 1.

FIG. 4 is a front plan view of a latch component 300 in accordance with at least one embodiment as related to FIG. 2. The mounting point 302 is shown with threads to accommodate a screw or bolt, however; other embodiments may include no holes, smooth holes, a different shape, and/or no extension from the latch housing 350. A reference line for the cutaway location 370 relates to FIGS. 7A, 7B, 7C, 8A, 8B, and 8C as the fore-mentioned figures are cut in half so that the inside can be envisioned to detail the functionality of the latch component 300 with the multi-piece ring 200.

Figure 5:
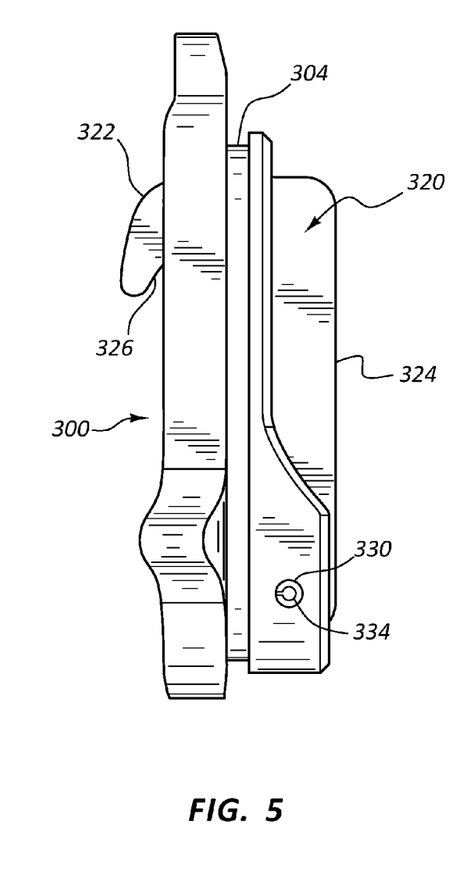
FIG. 5 is a left side plan view of the latch component in accordance with at least one embodiment as related to FIG. 4.

FIG. 5 is a left side plan view of the latch component 300 in accordance with at least one embodiment as related to FIG. 4. As shown in prior figures, FIG. 5 illustrates the pre-latch arc 322, cover retaining groove 304, latch 320, press point 324, pivot pin 330, pivot point 334, and latch stop 326. Other embodiments may include a stop in a different form or location on the latch housing 350 that keeps the latch 320 in the proper closed position.

Figure 6:
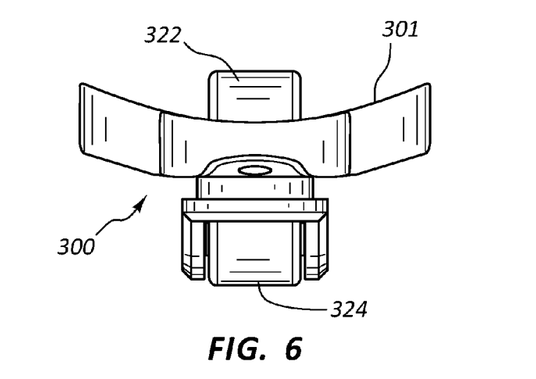
FIG. 6 is a top view of the latch component in accordance with at least one embodiment as related to FIG. 4.

FIG. 6 is a top view of the latch component 300 in accordance with at least one embodiment as related to FIG. 4. The fork guard coupling surface 301 is shown with a smooth curve, however; other embodiments may include different curve angles.

The forward or backward action of the pre-latch arc 322 moves at the rate of the pressure to the press point 324. Although the press point 324 is the ideal portion of the latch 320 to apply pressure for engagement, pressure may be applied to any upper portion of the latch 320 for sufficient engagement.

Figure 7B:
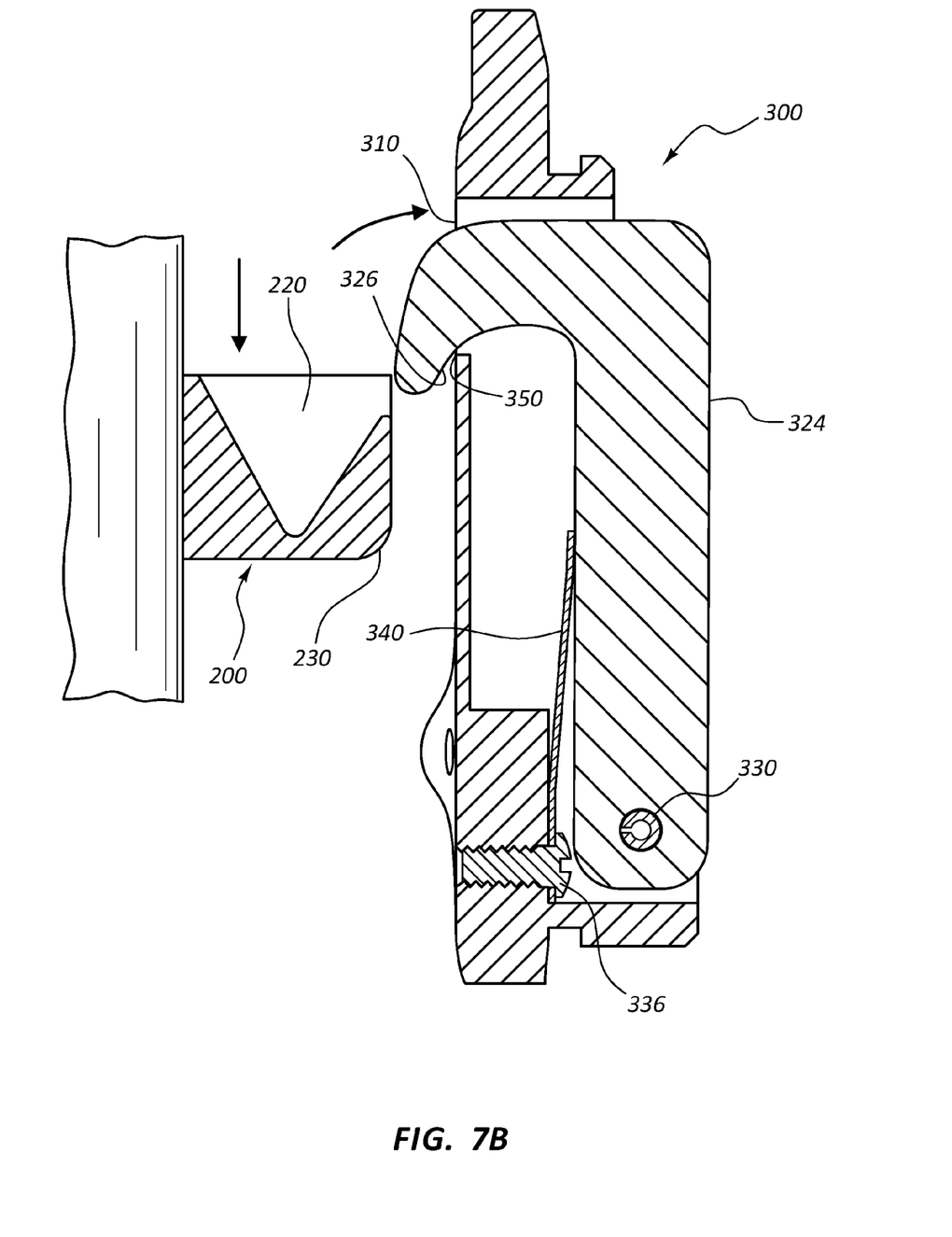
FIG. 7B is a left cut-away view as related to FIG. 4 in the closed position disengaged from the tapered receiver of the multi-piece ring.
Figure 7C:
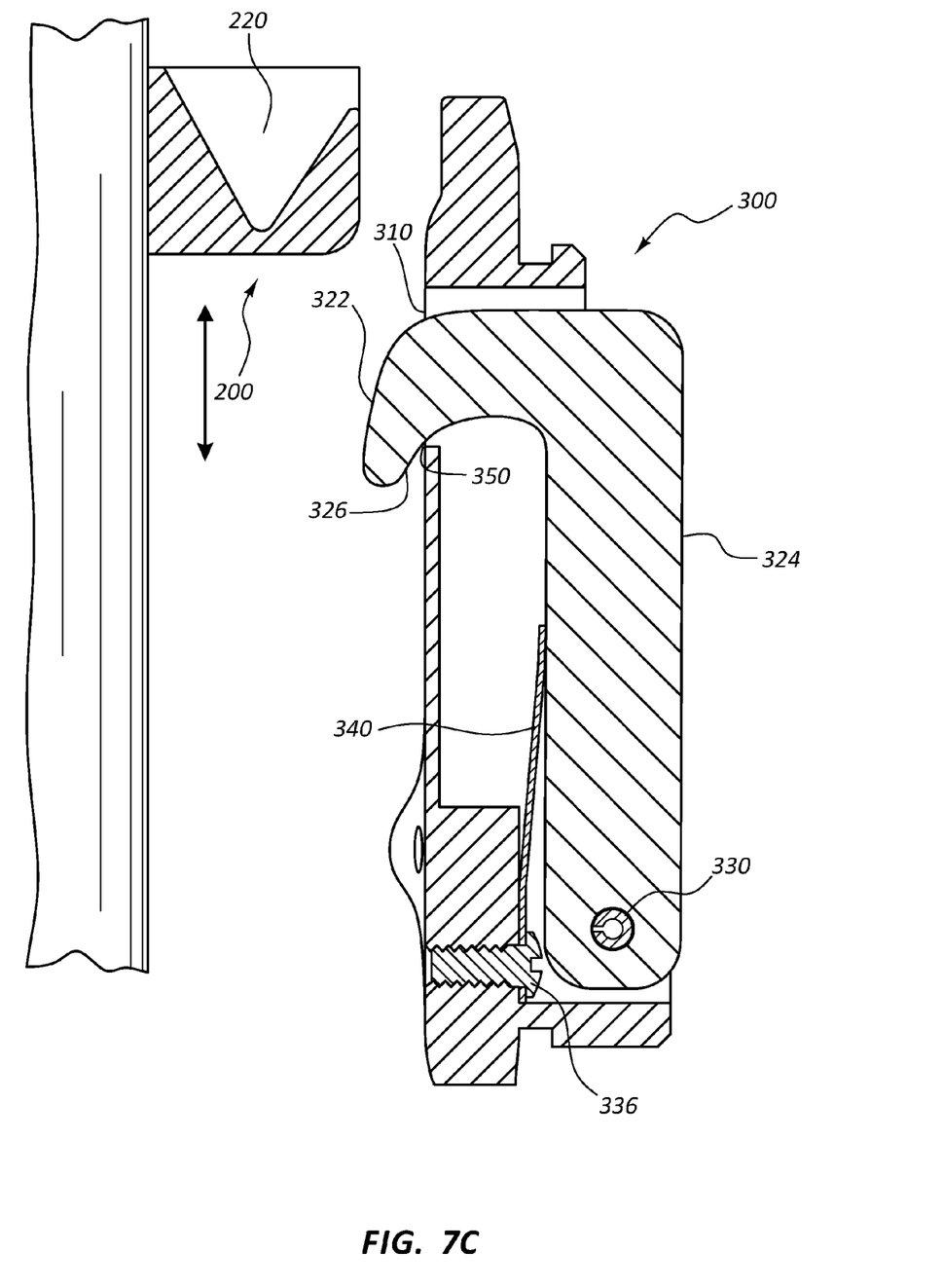
FIG. 7C is a left side cut-away view of a latch component cut in half as related to FIG. 4 in the closed position disengaged from a tapered receiver not in the engagement zone.

FIG. 7C is a left side cut-away view of the latch component 300 as related to FIG. 4. The telescopic suspension may be compressed or decompressed as shown with the up and down arrow next to the multi-piece ring 200. As shown in FIG. 7C, the latch 320 is not in the engagement zone in closed position as the multi-piece ring 200 is moving toward or away from the latch 320.

FIG. 7C with the arrow pointing up shows the latch component 300 and multi-piece ring 200 system returning to standard operation following the compression of the telescoping forks. The latch 320 defaults to the closed position using a flat spring 340 after clearing the tapered receiver 220. The first time suspension is compressed with enough pressure via a bump or applying the front brake the latch 320 will clear the top of the tapered receiver 220. The flat spring 340 or elastomeric material 360 will return and retain the latch 320 to the closed position allowing the suspension to operate as normal. The latch 320 may be pressed into the open position to prepare for engagement with the tapered receiver 220.

The tapered receiver 220 has tapered sides that come to a point at the bottom. The tapered receiver 220 guides the latch 320 into the final engagement point and secures the latch in position until disengaged.

FIG. 7C with the arrow pointing down shows the multi-piece ring 200 with the latch component 300 during compression of the telescopic suspension. As the suspension is compressed, the multi-piece ring 200 moves toward the engagement zone with the latch component 300. The latch 320 is shown is in the closed position using a flat spring 340. The flat spring 340 retains the latch 320 to the closed position allowing the suspension to operate as normal. The latch 320 may be pressed into the open position to prepare for engagement with the tapered receiver 220.

FIG. 7B is a left side cut-away view of the latch component 300 as related to the cutaway location 370 in FIG. 4. The latch component 300 is shown as disengaged in the closed position in the engagement zone with the tapered receiver 220. FIG. 7B illustrates the transition point to engage the latch 320 into the tapered receiver 220 by pressing the latch 320 at the press point 324. FIG. 7B also shows the position of the tapered receiver 220 moves down during compression of the telescopic suspension allowing the latch 320 to retract back to the closed position with the force of the flat spring 340.

FIG. 7A is a left side cut-away view of the cut-away location 370 as shown in FIG. 4 of a latch component 300 in the open position latched into the tapered receiver 220. FIG. 7A shows a latch component 300 and multi-piece ring 200 system with the latch 320 pressed in against a flat spring 340.

FIG. 7A shows the latch component 300 and multi-piece ring 200 system connection actions using the flat spring 340 to control latch component 300 actions. The suspension will be pressed down or compressed with the latch component 300 in closed position. While being compressed a latch 320 will move past the tapered receiver 220 FIG. 7B at which time the latch 320 is pressed in at the press point 324.

The flat spring 340 is secured into the latch housing 350 by a spring retainer fastener 336, however; in other embodiments the flat spring 340 may be secured by other types of fasteners such as glue, weld, bolt(s), nail(s), clip(s), button (s), etc.

The latch 320 can be pressed into the open position before the suspension is compressed. As the latch 320 contacts the radius perimeter of a pre-latch radius 230 in conjunction with the pre-latch arc 322 on the latch 320, those angled and/or radius surfaces allow the latch 320 to glide over the underside of the tapered receiver 220 with the latch 320 continually pressed into the open position during compression of the telescopic suspension.

While the latch 320 is still pressed in, pressure that was used to compress the suspension is removed after the latch 320 passes the engagement position shown in FIG. 7B allowing the suspension to return or rebound, at which time the latch 320 will be guided by the tapered receiver 220.

FIG. 7A shows the suspension still in rebound or return action towards full travel as the latch 320 is guided by the tapered receiver 220 to the final resting place of the latch 320 at the bottom of the tapered receiver 220 which then stops rebound movement of the suspension, temporarily limiting the full travel of the suspension.

Alternative embodiments of the latch 320 may comprise of a trigger-hook where a user must pull a trigger to engage a hook into a secondary connector for engagement or a pin button where a user must push a pin button to secure into a secondary connector. Other latch 320 control action embodiments may include magnets, coil springs, liquid, air, gas, tapered springs, torsion springs, compression springs, tension springs, leaf springs or garter springs.

Figure 8A:
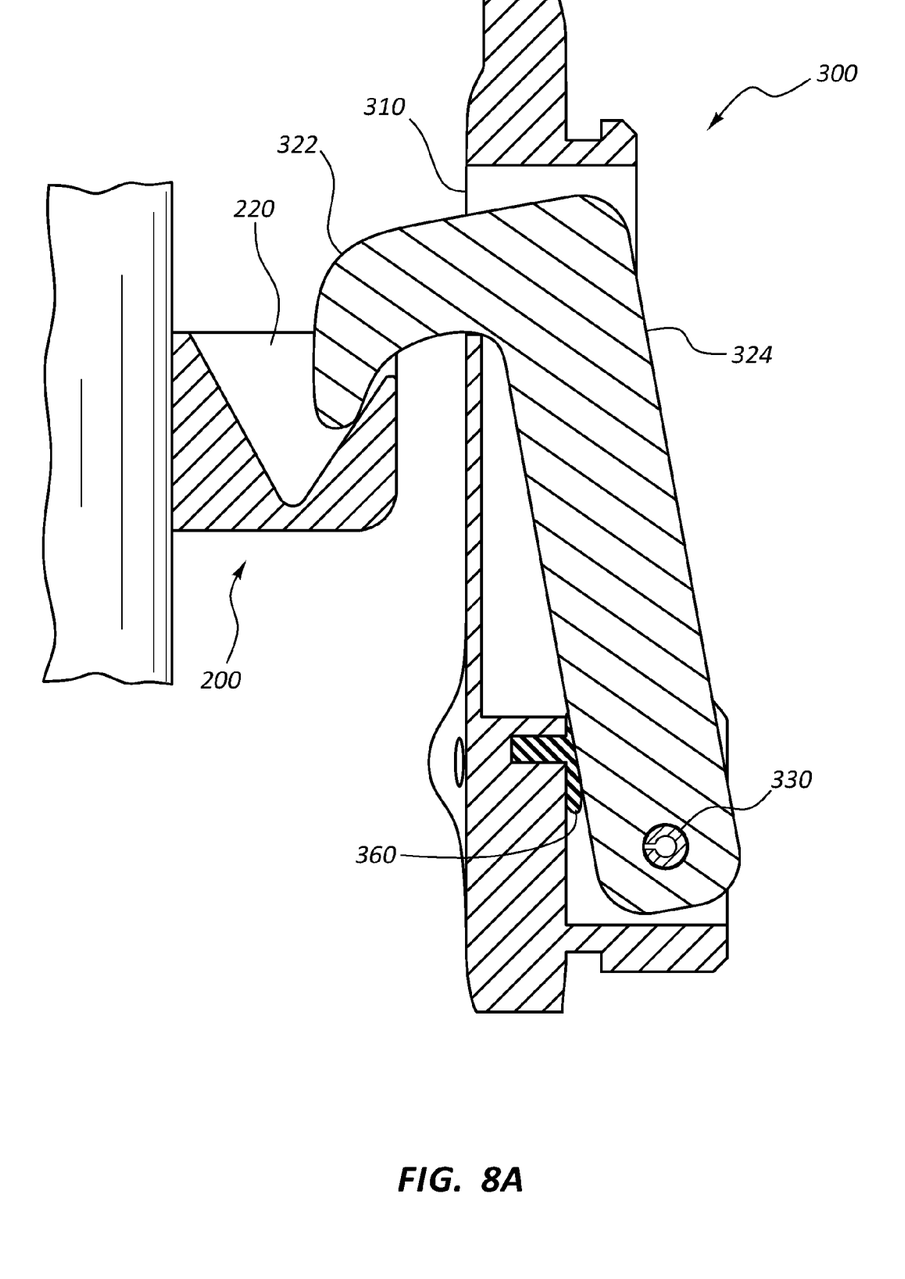
FIG. 8A is a left side cut-away view of the latch component cut in half as related to FIG. 4 in the open position engaged with the tapered receiver.
Figure 8B:
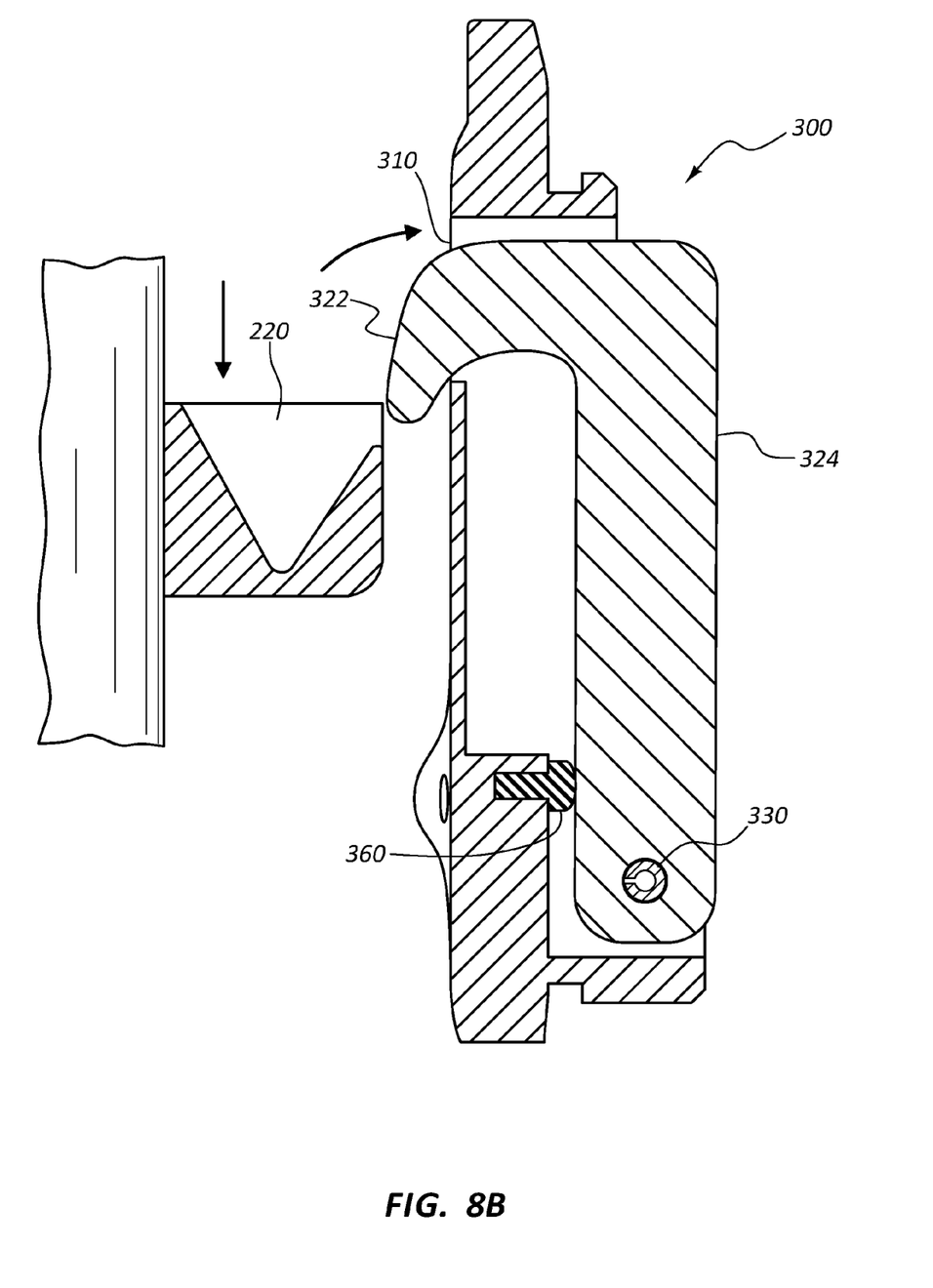
FIG. 8B is a left side cut-away view of a latch component cut in half as related to FIG. 4 in the closed position disengaged from the tapered receiver.
Figure 8C:
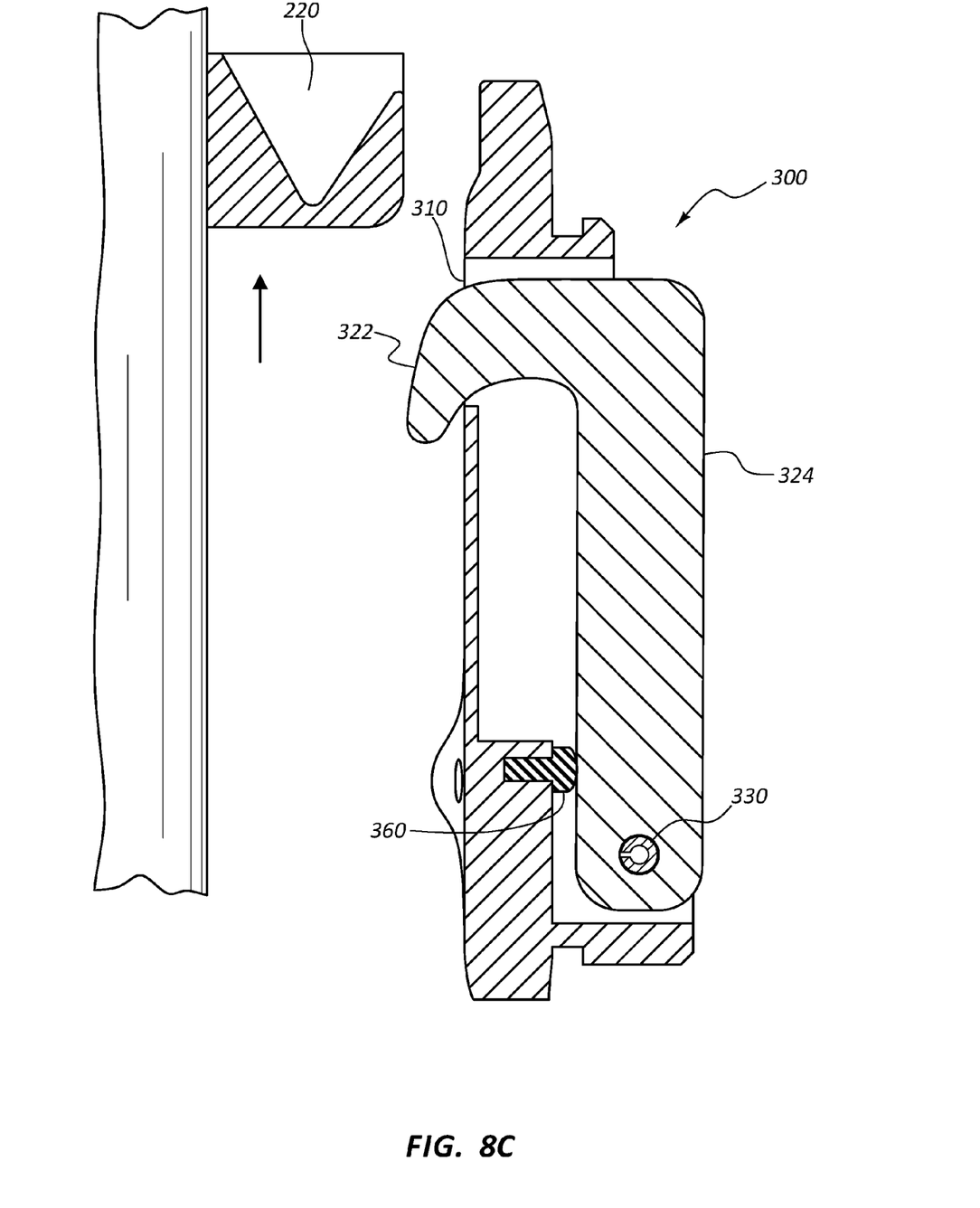
FIG. 8C is a left side cut-away view of a latch component cut in half as related to FIG. 4 in the closed position disengaged from the tapered receiver not in the engagement zone.

FIG. 8C is a left side plan view of the latch component 300 cut in half at the cutaway location 370 as related to FIG. 4 disengaged in the closed position not in the engagement zone from the tapered receiver 220 in the engagement zone. FIG. 8C shows the latch component 300 and multi-piece ring 200 system connection actions using an elastomeric material 360 to control latch component 300 actions. Although FIG. 7C and FIG. 8C shows distinct latch 320 retention actions by the elastomeric material 360 or the flat spring 340, other embodiments may include other types of latch 320 retention elements.

FIG. 8B is a left side plan view of the latch component 300 cut in half as related to FIG. 4 disengaged in the closed position from a tapered receiver 220. FIG. 8B illustrates the engagement point where the latch component 300 and multi-piece ring 200 may either engage or disengage as related to FIG. 8A. FIG. 8B shows the latch component 300 and multi-piece ring 200 system connection actions using the elastomeric material 360 to control latch component 300 actions.

Operating the suspension limiting device 100, the suspension will be pressed down or compressed with a latch component 300 in closed position. While being compressed a latch 320 will move past the tapered receiver 220 at which time the latch 320 is pressed in at the press point 324.

FIG. 8A is a left side plan view of a latch component 300 cut in half as related to FIG. 4 in the open position engaged into a tapered receiver 220. FIG. 8A shows the latch component 300 and multi-piece ring 200 system connection actions using the elastomeric material 360 to control latch component 300 actions.

The latch 320 can be pressed into the open position before, during or after the suspension is pressed down or compressed. As the pre-latch arc 322 on the latch 320 contacts the pre-latch radius 230 on the multi-piece ring 200, the fore mentioned pre-latch arc 322 and pre-latch radius 230 angled and radius surfaces will allow the latch 320 to slide over the pre-latch radius 230 on the underside of the tapered receiver 220 while the latch 320 was continually pressed into the open position. Other embodiments contain perimeters that could be chamfered, rounded, angled, sloped, curved, and/or arched.

The latch 320 automatically fully disengages from the tapered receiver 220 when the telescopic suspension is slightly compressed by the upward force upon contacting rough terrain and/or braking.

Figure 9:
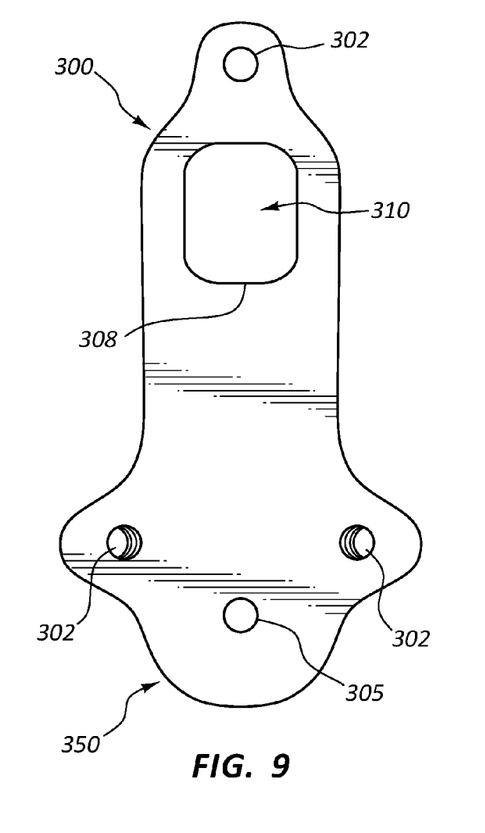
FIG. 9 is a rear view of the latch component in accordance with at least one embodiment, the opposite view of FIG. 4.

FIG. 9 is a rear view of the latch housing 300 in accordance with at least one embodiment, the opposite view of FIG. 4.

Figure 10:
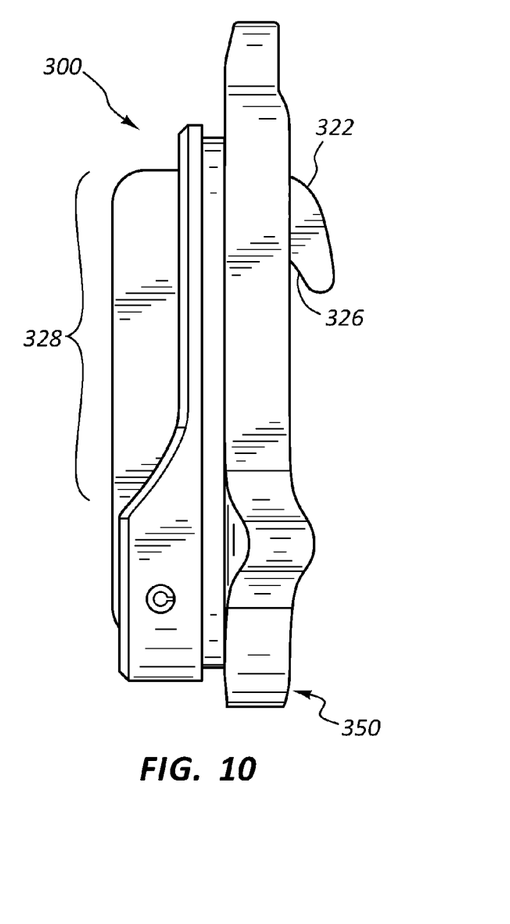
FIG. 10 is a right side view of the latch component in accordance with at least one embodiment, the opposite view of FIG. 5.

FIG. 10 is a right side view of a latch component 300 in accordance with at least one embodiment, the opposite view of FIG. 5.

Figure 11:
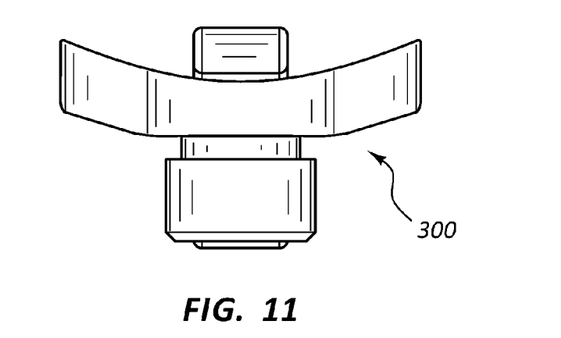
FIG. 11 is a bottom view of the latch component in accordance with at least one embodiment, the opposite view of FIG. 6.

FIG. 11 is a bottom view of a latch component 300 in accordance with at least one embodiment, the opposite view of FIG. 6.

Figure 12:
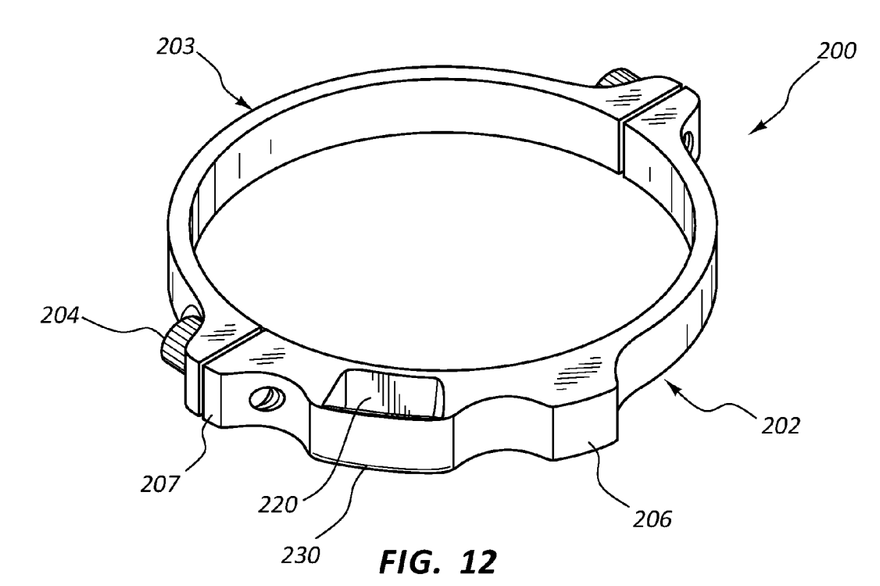
FIG. 12 is a top perspective view of the multi-piece ring in accordance with at least one embodiment as related to FIG. 1.

FIG. 12 is a perspective view of the top of a multi-piece ring 200 in accordance with at least one embodiment as related to FIG. 1. A multi-piece ring 200 includes a rear segment 203 which provides the placement of fasteners 204 through the rear segment 203 to thread into the fastener lugs 207 on the receiver segment 202 which incorporates a tapered receiver 220 and a pre-latch radius 230.

Fastener lugs 207 allow fasteners 204 to securely clamp the two halves around an outer fork tube 130 or inner fork tube 140 when tightened. Other embodiments of the fastener lugs 207 may be glue, weld, nail, clips, bolts, and/or screws. The fork guard stand-off 206 in conjunction with the fastener lugs 207 maintains proper clearance between the tapered receiver 220 on the multi-piece ring 200 and the interior are of the fork guard 120 during standard compression and rebounding action of telescopic suspension.

Figure 13:
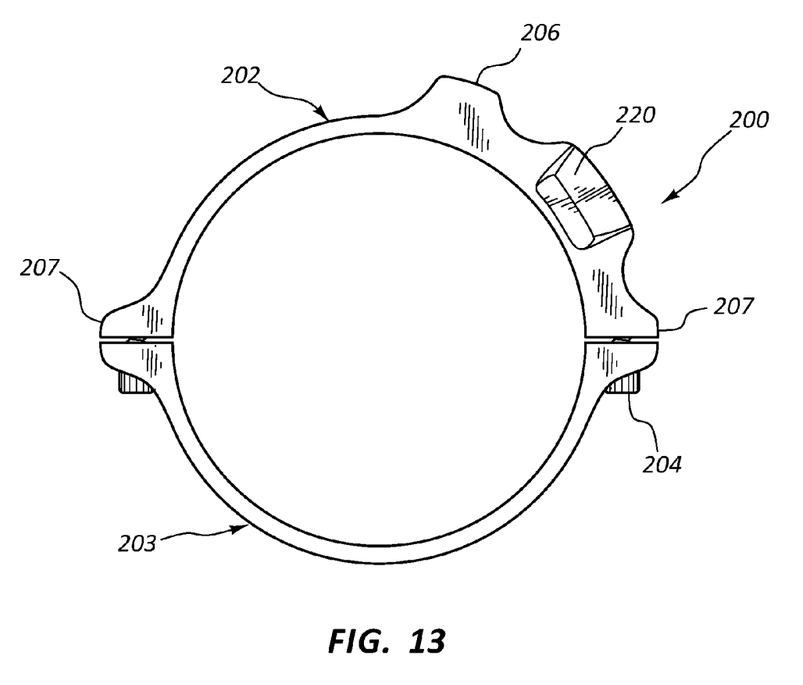
FIG. 13 is a top plan view of the multi-piece ring in accordance with at least one embodiment as related to FIG. 12.

FIG. 13 is a top view of the top of a multi-piece ring 200 in accordance with at least one embodiment as related to FIG. 12. Two (2) fastener lugs 207 and two (2) fasteners 204 are shown in FIG. 13, however; only one (1) fastener lug 207 and one (1) fastener 204 may be present in another embodiment. Other embodiments could also include three (3) or more fastener lugs 207 and/or fasteners 204.

Figures 14, 15, 16:
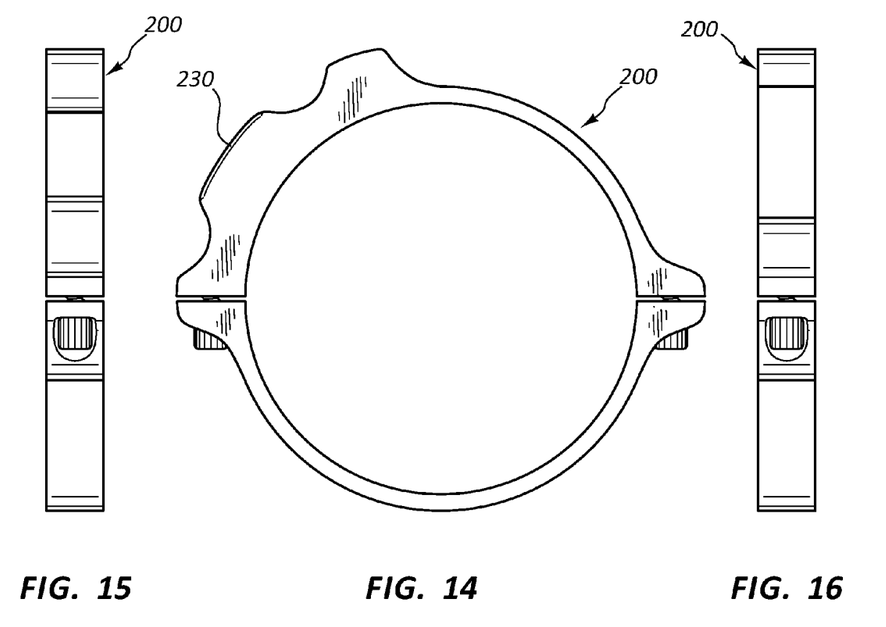
FIG. 14 is a bottom plan view of the multi-piece ring in accordance with at least one embodiment, the opposite view of FIG. 13.
FIG. 15 is a left plan view of the multi-piece ring in accordance with at least one embodiment as related to FIG. 14.
FIG. 16 is a right plan view of the multi-piece ring in accordance with at least one embodiment, the opposite view of FIG. 15.

FIG. 14 is a bottom view of the bottom of the multi-piece ring 200 in accordance with at least one embodiment, the opposite view of FIG. 13. The multi-piece ring 200 allows for installation without removing the outer fork tube 130 or inner fork tube 140 from a motorcycle while providing strong clamping force for the multi-piece ring 200 to grip the outer fork tube 130 or inner fork tube 140.

FIG. 15 is a left plan view of the multi-piece ring 200 in accordance with at least one embodiment as related to FIG. 14.

FIG. 16 is a right plan view of the multi-piece ring 200 in accordance with at least one embodiment, the opposite view of FIG. 15.

Figure 17:
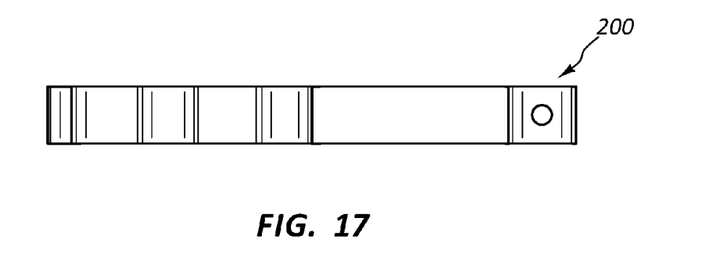
FIG. 17 is a front plan view of the multi-piece ring in accordance with at least one embodiment as related to FIG. 14.

FIG. 17 is a front plan view of the multi-piece ring 200 in accordance with at least one embodiment as related to FIG. 14.

Figure 18:
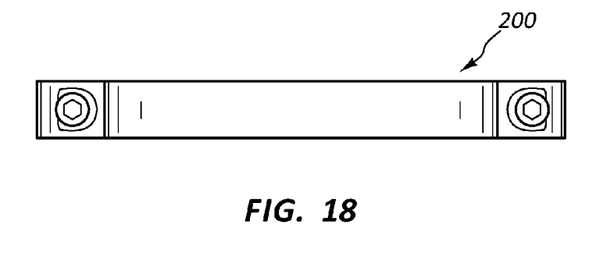
FIG. 18 is a rear plan view of the multi-piece ring in accordance with at least one embodiment, the opposite view of FIG. 17.

FIG. 18 is a rear plan view of the multi-piece ring 200 in accordance with at least one embodiment, the opposite view of FIG. 17. Although this embodiment is shown with two (2) fastener lugs 207, other applications may include one (1) or more fastener lugs 207 on a ring that is made of a bendable, yet structurally sound material that can be secured to a fork.

The above specification, examples and structures provide a complete description of the manufacture and use of the composition of the invention. Although specific embodiments have been illustrated and described herein, appreciation may be expressed by those of ordinary skill in the art and others, that a wide variety of alternate and/or equivalent implementations may be substituted for the specific embodiment shown in the described without departing from the spirit and scope of the present disclosure. This application is intended to cover any adaptations or variations of the embodiments discussed herein. Therefore, this invention is manifested and intended that the disclosure be limited only by the claims and the equivalence thereof.

I claimed:

1. A suspension limiting device for use with a telescopic suspension having an inner fork tube and an outer fork tube that move concentrically on a vehicle, having a fork guard, the suspension limiting device comprising:
   a two-piece ring secured to the outer fork tube, the ring having a self-centering tapered "V" shaped receiver; and a latch housing secured to the fork guard with 3 or more fasteners, the latch housing including a latch, with a curved tapered end, the latch pivots on the opposite end from the curved tapered end to engage with the self-centering tapered "V" shaped receiver of the ring; a smooth flat press point on the latch to extend a latch stop on the latch outside the housing into a position to temporarily engage the receiver, to temporarily limit the concentric movement of the telescopic suspension; a flat spring or elastomeric material, within the housing, on the opposite side of the smooth flat press point on the latch to close or retract the latch back into the housing after the latch and receiver disengage whenever the telescoping suspension is compressed slightly thereby allowing the latch to disengage from the "V" shaped receiver, the flat spring or elastomeric material retracting the latch back into the housing, and return the telescopic suspension to full travel.

2. The device as recited in claim 1, wherein the latch includes a curved perimeter to allow the latch to slide over the ring prior to engaging the receiver.

3. The device as recited in claim 1, wherein the receiver of the ring is configured to capture the latch of the suspension limiting device.

4. The device as recited in claim 3, the receiver further comprises a tapered surface designed to secure the engagement of the latch, and a radius perimeter; and
wherein the latch further comprises
a second radius perimeter, thereby allowing the radius perimeter of the latch to slide over the radius perimeter of the receiver as the suspension limiting device is engaged.

5. The device as recited in claim 4, wherein the second radius perimeter and the receiver radius perimeter allows the latch to be pressed into an open position before, during or after the receiver has passed an engagement point of the latch during compression.

6. The device as recited in claim 4, wherein the self-centering tapered "V" shaped receiver is configured with non-perpendicular sides allowing the latch to be guided passed an engagement point to a terminal location of the latch.

7. The device as recited in claim 1, wherein the ring includes at least two fastener lugs, the ring further comprising at least two fasteners, wherein a first fastener and a second fastener are configured for adjustment between at least a first position and a second position without requiring the removal of the telescopic suspension.

8. A method of temporarily limiting a suspension, the method comprising:
compressing a telescopic suspension having an inner fork tube and an outer fork tube that move concentrically;
pressing a latch installed on a fork guard into an open position, the fork guard being secured to the inner fork tube of the telescoping suspension, to allow the open position;
engaging a self-centering tapered "V" shaped receiver, fastened to the outer fork tube, with the latch before, during, or after the action of compressing the telescopic suspension so that the receiver will laterally pass the latch, with the latch still pressed open until compression pressure on the telescopic suspension is released and the telescopic suspension rebounds to capture the open latch within the receiver; and
disengaging the latch from the receiver by compressing the telescopic suspension, wherein the latch automatically, returns to a closed position inside a low profile housing, using a flat spring or elastomeric material.

9. The method of claim 8, wherein the disengaging of the latch from the receiver includes slightly compressing the telescopic suspension from an upward force from contact of rough terrain or braking.

10. A suspension limiting apparatus comprising:
a two-piece ring configured in two halves, the ring including a self-centering tapered "V" shaped receiver and at least two fastener lugs to secure the ring to an outer fork tube;
at least two ring fasteners, each ring fastener paired to one of the at least two fastener lugs;
a latch housing securable to a fork guard with three or more latch fasteners, the latch housing containing a latch with a pivoting latch arm, the latch arm having a curved tapered end, the latch positioned within the latch housing such that a latch pivot point is opposite the curved end of the latch arm, wherein the latch can be pressed into an open position before, during or after compressing the suspension will engage with the self-centering tapered "V" shaped receiver of the ring to limit concentric movement of a telescopic suspension; and
a flat spring or elastomeric material, inside the housing, to return the latch inside the housing after disengaged from the self-centering tapered "V" shaped receiver whenever the telescopic suspension is slightly compressed from an upward force after the latch and receiver are engaged.

11. The apparatus of claim 10, wherein the latch includes a flat smooth surface to press the latch for rotation about a pivot point to move the latch to the open position.

12. The apparatus of claim 10, wherein the flat spring retains the latch in a closed position.

13. The apparatus of claim 10, wherein the elastomeric material retains the latch in a closed position.

14. The apparatus of claim 10, the receiver further comprises a tapered surface designed to secure the engagement of the latch, and a curved perimeter; and wherein the latch further comprises a latch stop to engage the tapered surface, and the curved tapered end, thereby allowing the curved tapered end of the latch to slide over the curved perimeter of the receiver as the suspension limiting device is engaged.

15. The apparatus of claim 10, wherein a first ring fastener and a second ring fastener are configured for selective adjustment of the ring on an outer fork tube without requiring the removal of the telescopic suspension.

* * * * *